United States Patent [19]

Cacak

[11] Patent Number: 4,838,971
[45] Date of Patent: Jun. 13, 1989

[54] FILAMENT WINDING PROCESS AND APPARATUS

[75] Inventor: Harold L. Cacak, Lincoln, Nebr.

[73] Assignee: Brunswick Corporation, Skokie, Ill.

[21] Appl. No.: 16,579

[22] Filed: Feb. 19, 1987

[51] Int. Cl.$^4$ ............................................. B29C 19/06
[52] U.S. Cl. ..................................... 156/173; 156/175;
156/273.9; 156/275.5; 156/322; 156/379.7;
156/380.2; 156/425
[58] Field of Search ............... 156/169, 172, 173, 175,
156/322, 425, 433, 273.9, 272.2, 275.5, 279.7,
380.2

[56] References Cited

U.S. PATENT DOCUMENTS

| | | | |
|---|---|---|---|
| 3,715,252 | 2/1973 | Fairbairn | 156/162 |
| 4,385,957 | 5/1983 | Wackerle et al. | 156/273.9 |
| 4,489,021 | 12/1984 | Antal | 156/273.9 |
| 4,613,390 | 9/1986 | Mela | 156/273.9 |

FOREIGN PATENT DOCUMENTS

| | | | |
|---|---|---|---|
| 0102711 | 3/1984 | European Pat. Off. | 156/273.9 |
| 1256972 | 12/1971 | United Kingdom . | |

*Primary Examiner*—David Simmons
*Attorney, Agent, or Firm*—Wood, Dalton, Phillips, Mason & Rowe

[57] ABSTRACT

A method and apparatus for filament winding an object from electrically conductive filament means impregnated with a thermomatrix binder. The filament means are wound onto an appropriate mandrel defining the shape of the object. An electrical current is passed through the filament means during the winding to thermally alter or melt the thermoplastic binder as the filament means are wound on the mandrel.

30 Claims, 2 Drawing Sheets

FILAMENT WINDING PROCESS AND APPARATUS

FIELD OF THE INVENTION

This invention generally relates to the art of forming objects by filament winding and, particularly, to a method and apparatus for filament winding an object having a thermomatrix to be heated for setting or curing the filament wound composite.

BACKGROUND OF THE INVENTION

A wide range of articles or objects are increasingly being fabricated or formed by filament winding processes, the articles ranging from large missile or spacecraft casings to medium size pressure vessels and even small couplings or fittings. The filaments used in such processes also are widely varied, including fiberglass, graphite, Kevlar and the like. Similarly, a variety of matrix binders are used to hold the filaments in a set or cured composite which is wound in the shape of the article or object, ranging from thermosetting epoxy resins which are heat-cured, to thermoplastic coatings about or impregnated in the filaments.

The art of winding filaments with thermoplastic matrix binders has become increasingly in demand. Such thermoplastic binders are easy to manage and eliminate the step of an independent curing process conventionally used with epoxy resin binders after the article has been wound. Thermoplastic coatings or impregnated binders can be heated and rendered soft or melted during the actual winding process itself and subsequent curing steps are not necessary. For instance, copending application Ser. No. 870,655, filed May 30, 1986, to Ho, and assigned to the assignee of this invention, shows a method of filament winding using thermoplastic impregnated filaments wherein an oven is used to generally heat the area about a mandrel upon which the filaments are wound. General heating may also include heating the mandrel itself. Often, a preheating step is used to at least partially melt or soften the thermoplastic matrix immediately before the filaments are wound on the mandrel. Details of the above process are incorporated herein by reference to the aforesaid application.

Another method of winding with thermoplastic impregnated filaments is shown in copending application Ser. No. 847,911, filed Apr. 13, 1986, to Sudduth et al, and assigned to the assignee of this invention. Rather than requiring a complete general heating of the area about the mandrel on which the filaments are wound, that process utilizes localized heating means to limit the heating to the immediate area about the filament as it is wound onto the mandrel. General heating requires a great deal of energy, and the localized heating process as disclosed in that application obviates such requirements. Ultrasonic means and preheating means also may be utilized as disclosed therein.

In all of the processes, including those described above, considerable energy and expensive apparatus are required to carry out the processes even though the processes have distinct advantages over filament winding with epoxy resins which must be subsequently cured. The present invention is directed to providing a novel method and apparatus for applying thermoplastic impregnated filaments or the like in a greatly simplified, significantly cheaper and safer process.

SUMMARY OF THE INVENTION

An object, therefore, of the invention is to provide a new and improved method and apparatus for filament winding an article or object from a thermomatrix binder, such as thermoplastic.

In the exemplary embodiment of the invention, filament means are used which are electrically conductive, such as graphite. Individual fibers may be coated with the thermoplastic binder or filament tapes or "rovings" (multiple individual fibers) may be impregnated with the thermoplastic binder. As used herein, the term "impregnated" is intended to incorporate any filament means which has the thermomatrix binder about or within the filament or filaments being wound to form the article or object.

The invention contemplates winding the filament means onto an appropriate mandrel defining the shape of the object. An electrical current is conducted or passed directly through the filament means during the winding to thermally alter, such as melting, the thermomatrix binder as the filament means is being wound on the mandrel. Either alternating current or direct current can be passed through the filament means.

The filament means are fed through payout means which is electrically isolated from ground and electrically connected to a power source. The mandrel is electrically conductive and electrically grounded. Therefore, the current can pass directly through the filament means between the payout means and the grounded mandrel to heat and melt the thermoplastic binder. Upon cooling, the thermoplastic sets or cures and no subsequent heating processes are required.

Another feature of the invention includes means for adjusting the current automatically as a function of the speed of winding the filament means on the mandrel. This facilitates a controlled current and constant heat, as the filaments are wound about a polar end of an object, for instance, wherein the velocity of the filaments decrease, as is known in the art.

In another form of the invention, the mandrel includes a non-conductive portion (such as a central portion) and spaced conductive portions (such as end portions). A voltage is applied between the conductive end portions. Therefore, as the filaments are wound onto the mandrel, spanning the spaced conductive portions thereof, the filaments are heated to provide an annealing of the wound composite. Preferably, the voltage between the spaced conductive portions of the mandrel is maintained constant while the current directed through the filament means from the payout means also is maintained constant.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
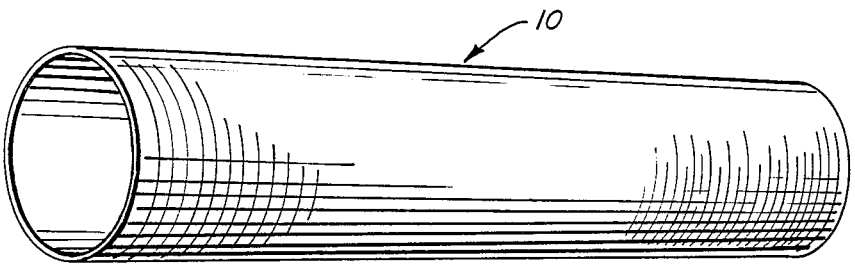
FIG. 1 is a perspective view of a tubular article or object which may be formed by the method and apparatus of the invention.

Referring to the drawings in greater detail, and first to FIG. 1, a tubular article or object, generally designated 10, is shown primarily for illustration purposes to facilitate an understanding of the invention. This depiction is in no way limited, because as stated above, filament winding processes are used for a very wide range of applications in forming various objects from large spacecraft missile casings to small fittings or other parts.

Figure 2:
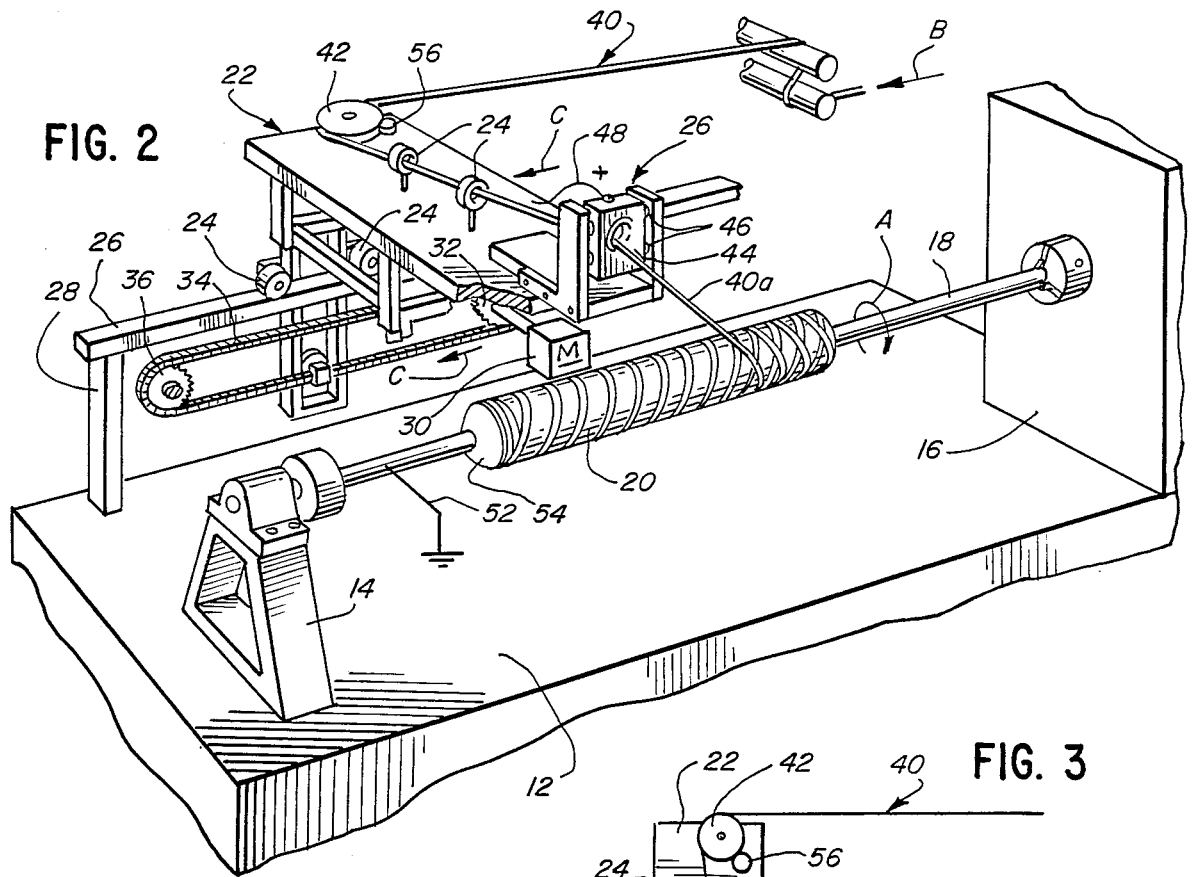
FIG. 2 is a perspective view illustrating the major components of the apparatus for carrying out the method of the invention.

FIG. 2 shows the major components of an apparatus for carrying out the invention. Again, this depiction is not intended to be limiting. Specifically, a platform or base 12 is provided with upstanding support members 14 and 16 between which a shaft 18 is journaled for rotation in the direction of arrow "A". A variety of motive means (not shown) may be provided for rotating shaft 18. A cylindrically shaped mandrel 20 is fixed to shaft 18 for rotation therewith. The mandrel, of course, defines the shape of the object, such as the cylindrical mandrel for forming tubular article 10 (FIG. 1).

A carriage, generally designated 22, is mounted by rollers 24 on a rail 26 of a framework 28 upstanding from platform 12. Therefore, the carriage can move back and forth longitudinally and generally parallel to shaft 18 and mandrel 20. Motive means, such as a motor 30, is drivingly connected to a sprocket 32 which meshes with a continuous chain drive 34 spanning a second sprocket 36 to move carriage 22 back and forth during the winding process. It should be understood that some of the components for supporting and driving carriage 22 are not illustrated in the drawings in order to avoid cluttering the drawings and to provide a simple understanding of the invention. In addition, as is known in the art, programming means are operatively connected to motor 30 in order to oscillate the carriage back and forth in a timed relationship and over a specific stroke governed by the shape and dimensions of the article to be wound.

Figure 3:
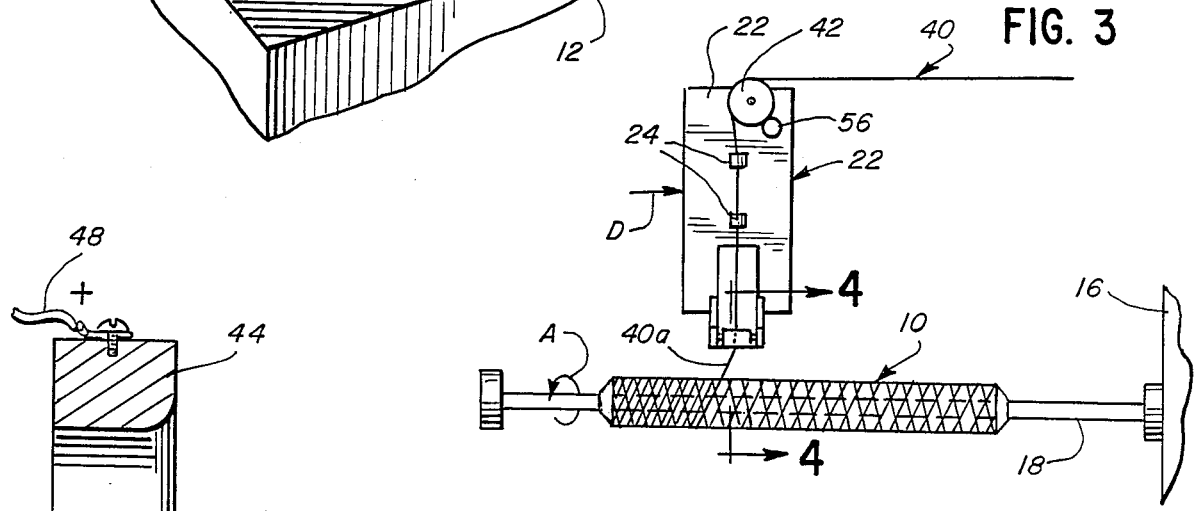
FIG. 3 is a top plan view, on a reduced scale, of certain of the components of FIG. 2.

Filament means, generally designated 40, are supplied from a source or reel which is not shown but which may be positioned at location to the right of FIG. 2. The filament means are fed to the apparatus as indicated by arrow "B". The filament means are fed to the apparatus, usually in a pulling action off of the supply reel as carriage 22 oscillates. The filament means passes about a pulley 42 journaled to the top of carriage 22, through a pair of guide eyelets 24, and through a payout means, generally designated 26, whereupon the filament means are wound upon mandrel 20, as at 40a. It can be seen that the portion 40a of the filament means in FIG. 2 is angled to the left, indicating that carriage means 22 is moving to the left, as indicated by arrows "C". FIG. 3 shows filament means portion 40a angled to the right and, therefore, indicates that carriage means 22 is moving to the right as indicated by arrows "D".

The invention contemplates utilizing filament means which are electrically conductive, such as graphite or the like. The invention also contemplates impregnating the filament means with a thermomatrix binder, such as thermoplastic, which is capable of being altered, such as melted, as current is passed through the filament means. The filament means may include a single filament or a tape or "roving" of a group of filaments wound onto mandrel 20 to form object 10.

Figure 4:
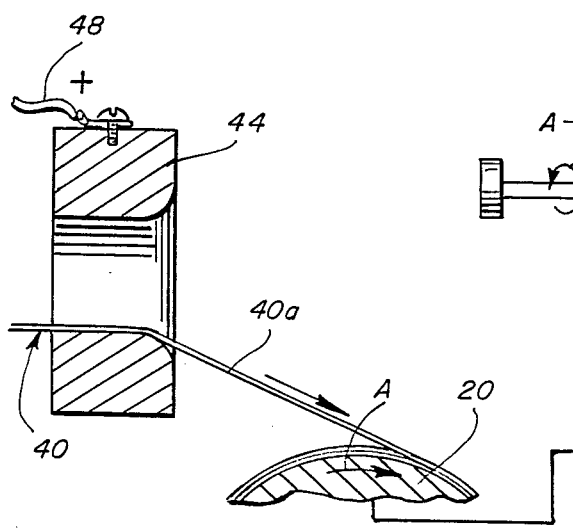
FIG. 4 is a fragmented, vertical section, on an enlarged scale, taken generally along line 4—4 of FIG. 3.

To this end, and referring to FIG. 4 in conjunction with FIGS. 2 and 3, payout means 26 includes an eyelet 44 which is electrically isolated from ground, such as by insulated spacers 46 (FIG. 2) and electrically connected to a power source, as at 48. Mandrel 20 is fabricated of electrically conductive material and is electrically grounded either directly, as at 50 in FIG. 4, or indirectly through shaft 18, as at 52 in FIG. 2, the shaft of course being electrically conductive. Therefore, an electrical current is passed or conducted through portion 40a of filament means 40 between eyelet 44 and mandrel 20 to heat the filament means and melt or alter the thermomatrix binder continuously as the filament means is wound onto the mandrel to form the article. The simplicity of such a method and apparatus is immediately apparent when considering that extraneous heating means, such as ovens, heated mandrels, laser means, ultrasonic means and all of the various components of the prior art are eliminated. The very depiction of the invention herein exemplifies the extreme simplicity of the invention. Not only are the expenses of the components and the cost of operation of prior art methods and apparatus greatly reduced, but the safety hazards of prior apparatus are practically eliminated. In addition, either alternating or direct current can be employed as the power source with the invention.

As is known, in filament winding articles as shown herein, once the filament means reaches the ends or "polar" areas of the mandrel, as at 54 in FIG. 2, the velocity or speed of paying out the filament means decreases even though the speed of rotation of the mandrel is constant. Therefore, the invention contemplates employing a tachometer 56 which is coupled to the controls of the apparatus to adjust the electrical current as a function of the speed of winding the filament means on the mandrel. In the embodiment of the invention shown herein, tachometer 56 simply is engaged with pulley 42 since the pulley will rotate in direct proportion to the payout or pulling of the filament means. Current adjustment proportional to the filament velocity is required if the winding speed of the filament means exceeds that of where an equilibrium is maintained between ambient dissipation and power input. In other words, the tachometer accommodates the change in required current to allow a constant temperature of filament means at the contact point of the mandrel. Since the tachometer is directly proportional to the feed rate, the current is adjusted instantaneously.

In order to exemplify the safety of the method and apparatus of the invention, an actual set-up of the apparatus has included a length of filament portion 40a on the order of $2\frac{1}{2}$ to $3\frac{1}{2}$ inches. Of course, this is not critical because the apparatus is set up for a constant current. However, with such a length, the resistance in a conventional ¼ inch filament roving is approximately 0.7 ohms/inch. Therefore, a power source of 3.75 amps, approximately 27-28 volts, can be used which is approximately the power required for energizing a 100 watt light bulb. The safety advantages of such a system is immediately apparent when compared to prior art processes using hot ovens and laser-type mechanisms. Even the article or object itself is much cooler than with conventional systems.

Figure 5:
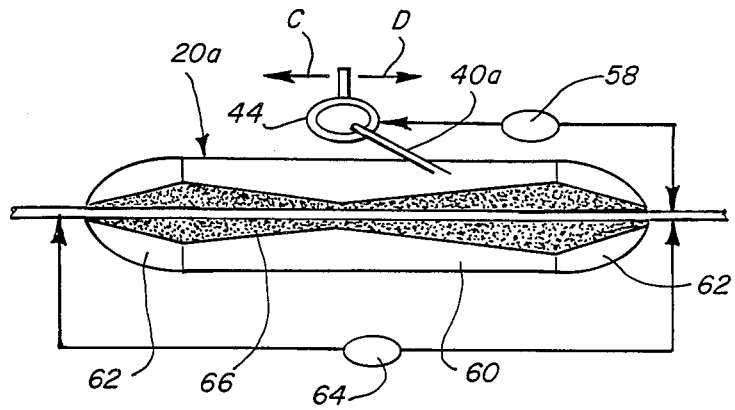
FIG. 5 is a schematic illustration of the process and apparatus of the invention wherein the mandrel is spaced conductive end portions spanned by the wound filaments.
Figure 6:
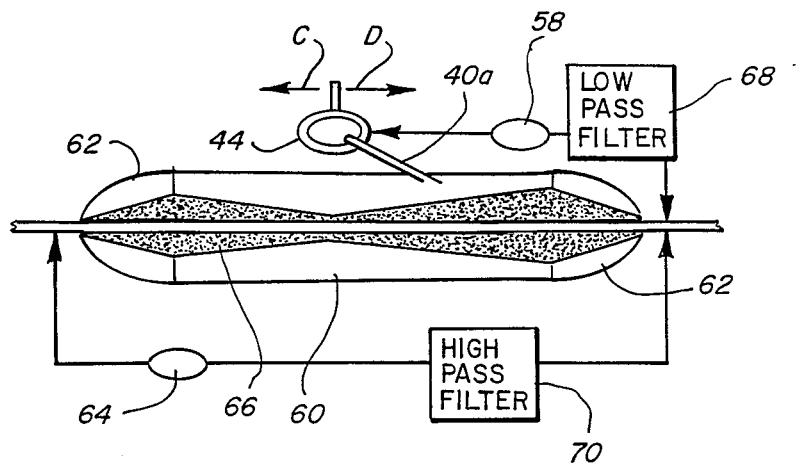
FIG. 6 is a schematic illustration similar to that of FIG. 5 but using different current modes.

FIGS. 5 and 6 illustrate an alternate form of the invention wherein a continuous annealing of the wound article is afforded during the winding process. Like numerals have been applied where applicable corresponding to like components described in relation to FIGS. 2-4. In other words, filament portion 40a is illustrated being fed through payout eyelet 44 as the carriage oscillates in the direction of arrows "C" and "D". However, this alternate embodiment of the invention includes a mandrel, generally designated 20a, which has a central non-conductive portion 60 and spaced conductive end portions 62. Payout eyelet 44 is electrically isolated from ground and coupled to a terminal of a power source 58. A power supply 64 terminates between spaced conductive mandrel portions 62 whereby the conductive filament means spanning the conductive mandrel portions, as at 66, are heated to maintain the thermomatrix binder at least partially molten during the winding process to anneal the filament wound composite as it is wound.

In the embodiment of FIG. 5, preferably two direct current power sources 58 and 64 are used. Power source 58 is used to heat filament portion 40a as the filament means is applied to the mandrel. The preferred power source is a constant current source, allowing constant uniform temperature in the delivered filament means regardless of its length. Power source 64 is used to maintain the article temperature allowing the annealing process. The preferred power source 64 is a constant voltage source, allowing constant uniform heat of the article of fixed length.

Alternatively, power sources 58 and 64 may be of alternating current. This would have the advantage of alternating current frequencies being resonant with the molecular frequencies of the thermoplastic binder to enhance the flow characteristics. Both power sources 58 and 64 preferably are constant current and constant voltage, respectively. Both power sources or supplies are phased together to maintain proper control.

FIG. 6 shows the embodiment of FIG. 5 wherein power source 58a may be a direct current source, while power source 64a may be an alternating current source. In this instance, low and high pass filters 68 and 70, respectively, would be employed to decouple the alternating and direct current sources.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A method of filament winding an object from electrically conductive filament means impregnated with a thermomatrix binder, comprising the steps of:
   providing pre-impregnated, solidified filament means;
   winding the pre-impregnated filament means onto an appropriate mandrel defining the shape of the object; and
   conducting an electrical current through the preimpregnated filament means during said winding to thermally alter the thermomatrix binder as the filament means are being wound on the mandrel.

2. The method of claim 1 wherein alternating current is conducted through the filament means.

3. The method of claim 1 wherein direct current is conducted through the filament means.

4. The method of claim 1 wherein said filament means are provided of graphite material.

5. The method of claim 1, including providing said filament means with a thermoplastic coating.

6. The method of claim 5 wherein said filament means are provided of graphite.

7. The method of claim 1, including feeding said filament means through payout means which is electrically isolated from ground and electrically connected to an electrical power source.

8. The method of claim 7, including winding said filament means on an electrically conductive mandrel which is electrically grounded.

9. The method of claim 8, including rotating said mandrel as the filament means are fed through the payout means.

10. The method of claim 9, including traversing said payout means systematically along the mandrel as the mandrel is rotated.

11. The method of claim 1, including adjusting said current automatically as a function of the speed of winding the filament means on the mandrel.

12. The method of claim 1 wherein the mandrel includes a non-conductive portion and spaced conductive portions, and including winding the filament means about the mandrel between the conductive portions of the mandrel while applying a voltage between the conductive portions.

13. The method of claim 12 wherein said voltage is maintained constant.

14. The method of claim 13 wherein said current is maintained constant.

15. The method of claim 1 wherein said current is maintained constant.

16. An apparatus for filament winding an object from electrically conductive filament means impregnated with a thermomatrix binder, comprising:
   supply means for pre-impregnated, solidified filament means;
   means for winding the pre-impregnated filament means onto an appropriate mandrel defining the shape of the object; and
   means for conducting a constant electrical current supply through the pre-impregnated filament means during said winding regardless of the filament length to thermally alter the thermomatrix binder as the filament means are being wound on the mandrel.

17. The apparatus of claim 16, including means for conducting alternate current through the filament means.

18. The apparatus of claim 16, including means for conducting a direct current through the filament means.

19. The apparatus of claim 16, including a supply of graphite filament means and means for feeding the filament means to the winding means.

20. The apparatus of claim 16, including a supply of thermoplastic coated filament means and means for feeding the filament means to the winding means.

21. The apparatus of claim 20 wherein said filament means are of graphite material.

22. The apparatus of claim 16, including payout means for feeding the filament means to the mandrel, the payout means being electrically isolated from ground and electrically connected to an electrical power source.

23. The apparatus of claim 22 wherein said mandrel is electrically grounded.

24. The apparatus of claim 23, including means for rotating the mandrel as the filament means are fed through the payout means.

25. The apparatus of claim 24, including means for traversing said payout means systematically along the mandrel as the mandrel is rotated.

26. The apparatus of claim 16, including means for adjusting the current automatically as a function of the speed of winding the filament means on the mandrel.

27. The apparatus of claim 16 wherein the mandrel includes a non-conductive portion and spaced conductive portions, whereby the filament means are wound about the mandrel between the conductive portions of the mandrel, and including means for applying a voltage between the conductive portions of the mandrel.

28. The apparatus of claim 27, including means for maintaining said voltage constant.

29. The apparatus of claim 28, including means for maintaining said current constant.

30. The apparatus of claim 16, including means for maintaining said voltage constant.

* * * * *